UNITED STATES PATENT OFFICE.

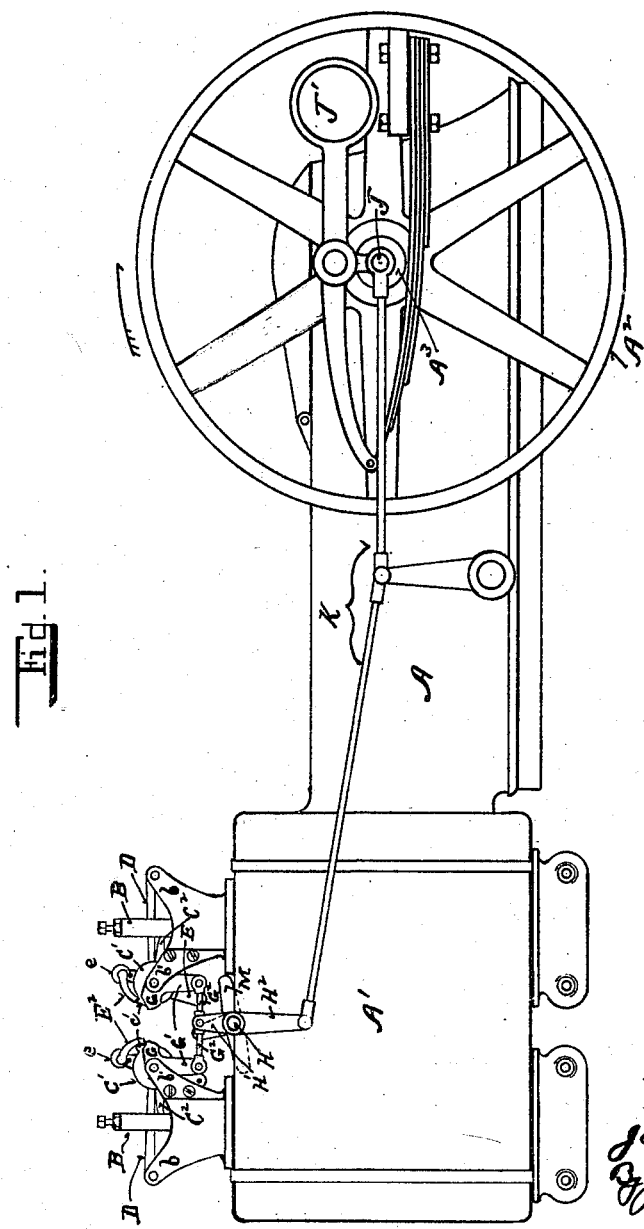

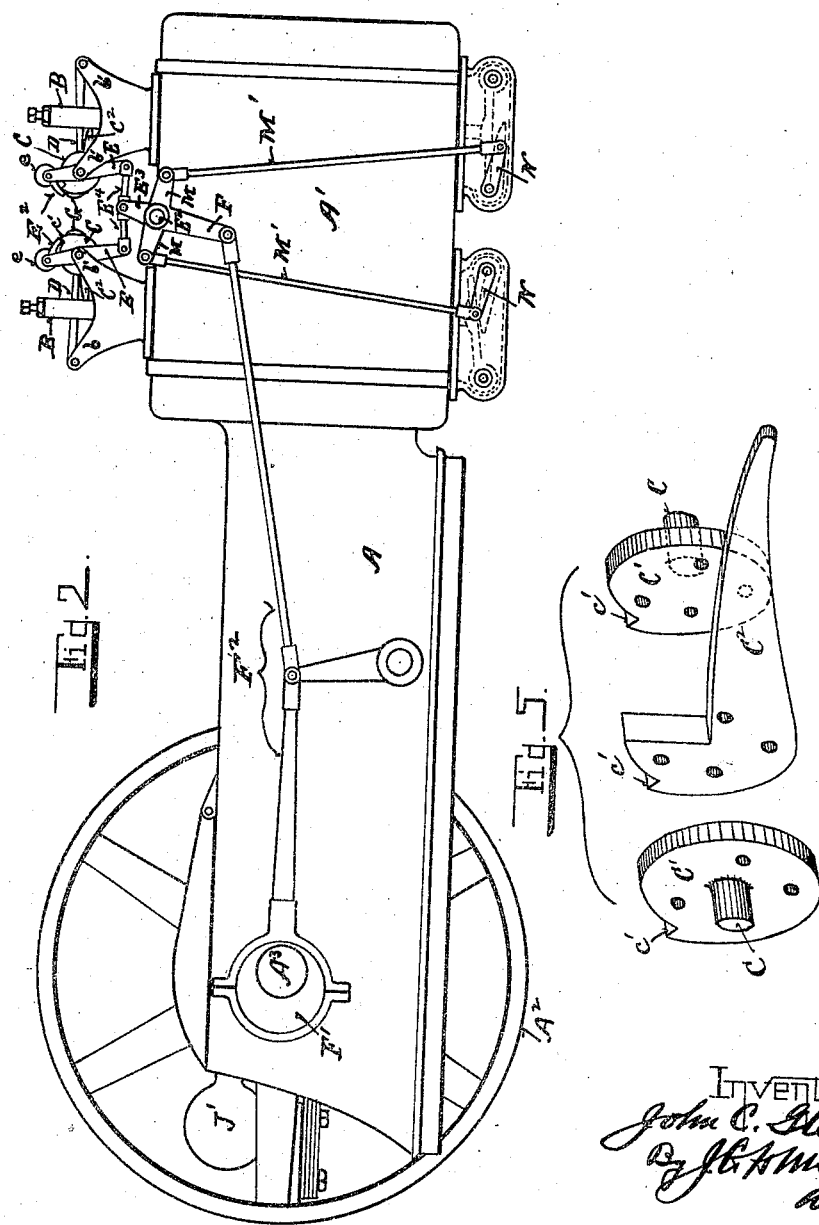

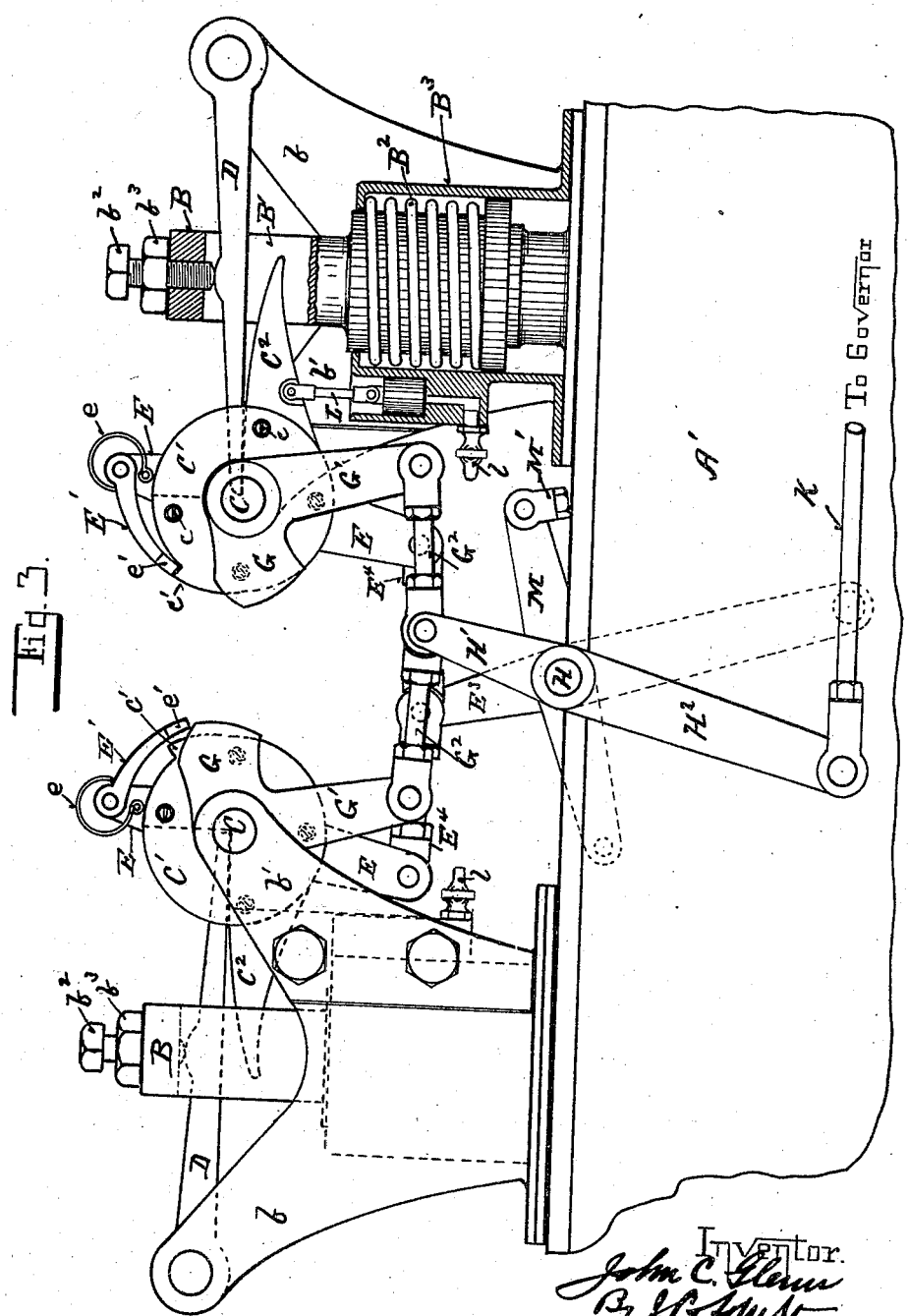

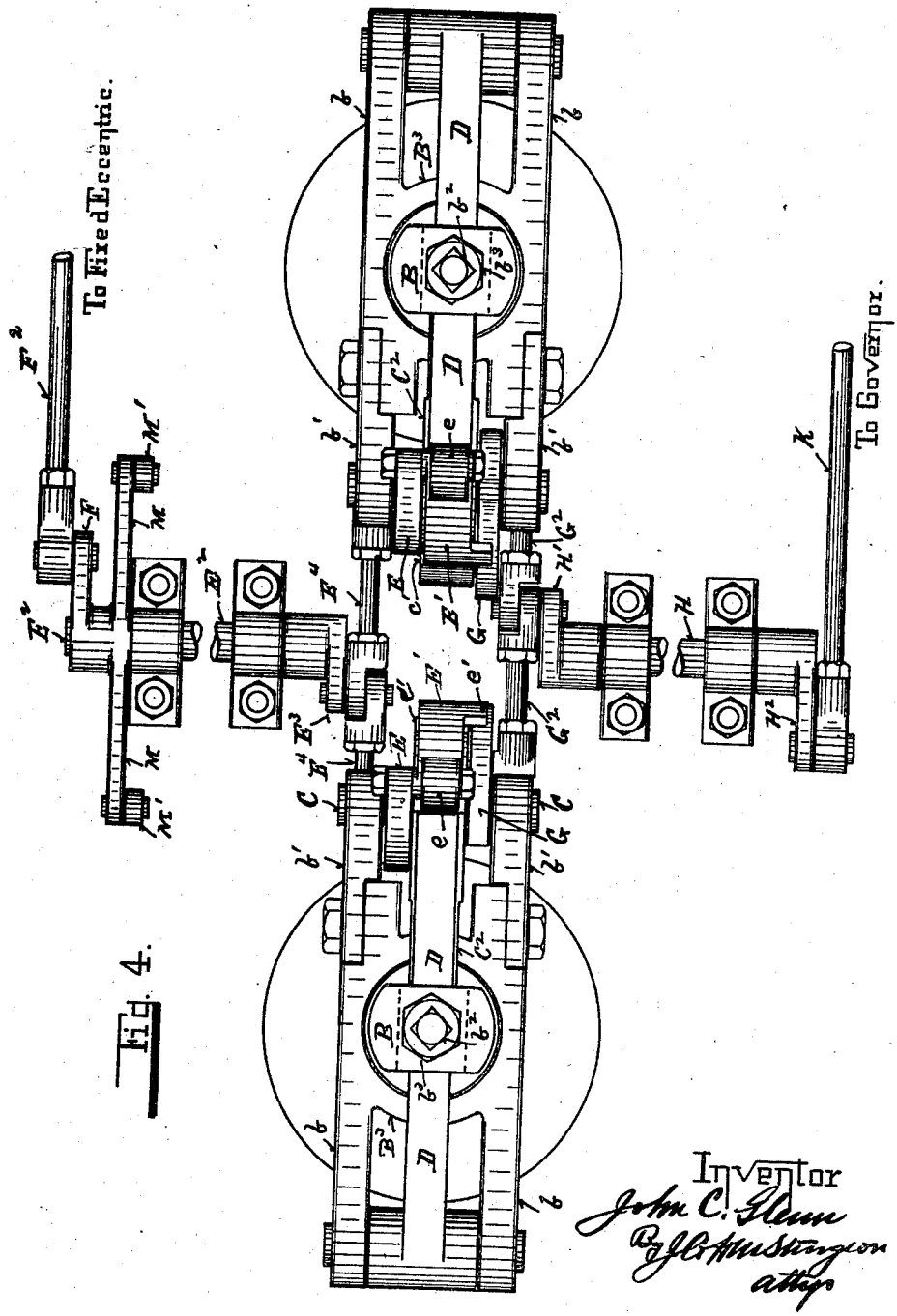

JOHN C. GLENN, OF ERIE, PENNSYLVANIA.

VALVE-GEAR MECHANISM.

1,306,332.

Specification of Letters Patent.

Patented June 10, 1919.

Application filed January 15, 1918. Serial No. 211,934.

*To all whom it may concern:*

Be it known that I, JOHN C. GLENN, a citizen of the United States, residing at Erie, in the county of Erie and State of Pennsylvania, have invented certain new and useful Improvements in Valve-Gear Mechanism; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to valve gear for steam engines, and consists in certain improvements hereinafter pointed out.

It is customary to operate the valves of engines by means of an eccentric on the engine shaft, and to control the movement of the steam admission valves by means of a governor installed in the fly-wheel adapted to shift the eccentric so as to decrease the eccentricity as the speed of the engine increased and vice versa, or to control the action of said steam admission valves by means of a fly-ball governor driven from the engine shaft. The last mentioned form of governing mechanism has been generally employed when it was desired to use a quick-release or snap-gear, which permits the steam admission valves to snap shut instantly. When the fly-wheel governor has heretofore been used to control the action of the engine intake valves, the valve-gear so operates that the opening movement and closing movement of the steam admission valves is gradual in each case.

The object of my invention is therefore to construct a valve-gear mechanism which can be so controlled by a fly-wheel governor mechanism that the steam admission valves will be released from their opening mechanism and permitted to instantly close without reference to the reverse movement of said valve opening mechanism.

To accomplish this object I connect the releasing cams with the wrist pin of the fly-wheel governor, and connect the valve lifting mechanism with a fixed eccentric on the engine shaft, so that when the valve is raised a predetermined distance the action of the governor causes the releasing cam to trip the gear and permit the valve to snap shut. When a fly wheel governor is used it is necessary to oscillate the releasing cams.

The valve-gear of my invention hereinafter described and pointed out is readily adaptable for use in combination with either puppet valves or valves of the Corliss type, without material change.

In carrying out my invention I provide a fixed eccentric on the engine shaft, which operates to open the admission valves, and I provide a shaft or fly-wheel governor mechanism, and connected cam mechanism which operates to sooner or later release the valve opening mechanism and thereby permit the steam admission valves to instantly close as the speed of the engine increases or decreases. These and other features of my invention are hereinafter more particularly described and pointed out and are illustrated in the accompanying drawings in which:

Figure 1, is a side elevation of a steam engine showing the fly-wheel governor and valve-gear of my invention thereon.

Fig. 2, is an elevation of the same showing the opposite side of the engine, showing the fixed eccentric and connecting gear for opening the admission valves.

Fig. 3, is an enlarged side view of a portion thereof.

Fig. 4, is an enlarged plan view thereof.

Fig. 5, is a perspective view of a portion thereof removed from its supports and taken apart.

In these drawings A indicates the engine frame; A' indicates the cylinder; $A^2$ indicates the fly-wheel secured upon the shaft $A^3$, all of usual construction.

In these drawings I show admission valve mechanism of the puppet type of usual construction, provided with a yoke B having a slot B' (see Fig. 3) and a spring $B^2$ to close the valve, which is inclosed in a housing $B^3$. This housing is provided with pairs of arms $b$ and $b'$. Mounted in the ends of the arms $b'$ upon the stud-posts C are disks C', and secured between said disks by means of screws or rivets $c$ is a lever $C^2$, which extends from the axis of said stud-posts C into the slots B' in the yoke B, the upper edge of said lever $C^2$ curving downward from the axis of said stud-posts C to the points of said lever.

I preferably form said lever $C^2$ so that it matches the contour of the disks C' at that portion thereof between the disks C' from the point where the lower edge thereof meets the periphery of said disks to a point vertically above the axis thereof, from which point down to the axis of said disks the space between said disks is unoccupied.

Pivoted between the ends of the arms $b$ is a lever D which extends through the slot B′ in the yoke B into the space between the disks C′ C′ adjacent to the axis thereof and rests upon the curved upper edge of the lever C²; and secured in the upper end of the yoke B is a set screw $b^2$ which engages the lever D; said set screw being provided with a lock nut $b^3$ to prevent accidental movement of said set screw.

The disks C′ C′ and lever C² are provided on their peripheries with coincident shoulders $c′$ by means of which the lever $c^2$ may be caused to raise the lever D and yoke B to open the admission valve (not shown).

Mounted upon the stud-post C between the disk C′ and one of the arms $b′$ (see Fig. 2) is a lever E, to the upper end of which is pivoted a dog E′ adapted to engage the shoulder $c′$ on the disk C′, and I provide a spring $e$ which presses downwardly on the dog E′.

Mounted on the cylinder A′ is a rock-shaft E² which is provided on the inner end thereof with a lever E³ (see Figs. 2 and 4) and between the upper end of the lever E³ and the lower end of the lever E is pivoted a link E⁴. The outer end of the rock shaft E² is provided with a lever F which is connected to the fixed eccentric F′ on the engine shaft A³ by means of eccentric rod mechanism F² of ordinary construction, so that as the eccentric F′ rotates the levers E are caused to oscillate and through the dogs E′ engaging the shoulder $c′$ on the disks C′ and lever C² is caused to oscillate thereby lifting the lever D and yoke B.

The dog E′ is provided at its free end with an offset or laterally projecting shoulder $e′$ (see Figs. 1, 3 and 4) which projects beyond the side face of the disks C′ opposite the lever E; and upon the stud-post C and arm $b′$ on that side I mount a cam G (see Figs. 1 and 3) adapted to engage the offset $e′$ on the dog E′ and disengage said dog from its engagement with the shoulders $c′$ and permitting the spring B³ to force the yoke B and lever D and lever C² instantly to return to their usual positions, as shown in Fig. 3. The cam G is provided with a lever G′ by means of which said cam G may be oscillated as hereinafter described. Mounted upon the engine cylinder A′ is a rock-shaft H the inner end of which is provided with an arm H′, and pivoted between the upper end of the lever H′ and the lower end of the lever G′ is a link G². The rock-shaft H is also provided at its outer end, with a lever H² which is connected with the wrist pin J of the fly-wheel governor mechanism J′ by means of the governor rod-mechanism K (see Fig. 1.)

The governor mechanism shown in Fig. 1 is of ordinary construction and operation, except when it is at rest the wrist-pin J is at the center or axis of the engine shaft A³; and when the speed of the engine increases, said wrist-pin gradually becomes eccentric to the axis of the shaft thereby causing the cams G to oscillate more or less according to the speed of the engine; and it is obvious that when the engine is being started that the disk C′ and lever C² will be oscillated substantially the full movement of the lever E, and that as the engine speed increases, the cams G will be oscillated more or less, by the governor wrist-pin and will engage the offset $e′$ on the dog E and disengage said dog from the shoulder $c′$ before the lever E has reached its full oscillation, thereby permitting a sooner release and closing of the valve.

In order to cushion the return of the lever C² to its normal position, I provide a dash-pot mechanism L (see Fig. 3) of usual construction, the stem of which is pivoted to the lever C²; said dash-pot being controlled by the usual valve $l$, by means of which any noise may be eliminated.

In Fig. 2 I have shown arms M on the lever F, and rods M′ extending therefrom to exhaust valve operating levers N, by means of which the said exhaust valve levers may be operated from the fixed eccentric in the usual manner.

Having thus fully shown and described my invention so that others can utilize the same, I do not desire to be limited to the exact construction of mechanism herein shown and described, as it is obvious that many changes can be made therein without departing from the scope of my invention; therefore what I claim as new and desire to secure by Letters-Patent is:

1. In a valve gear, a housing, a yoke vertically movable in said housing, a spring to normally retain said yoke in a downward position, a vertically oscillating lever pivoted at one side of said housing and extending toward said yoke, a projection on the hub of said lever, another lever pivoted on the pivot of said first lever, a dog pivoted on said lever and adapted to engage said projection, means to oscillate said last mentioned lever, and means to disengage said dog from said projection, a lever pivoted at the opposite side of said housing extending through said yoke and resting upon the first named lever and adapted to engage and raise said yoke, substantially as set forth.

2. In a valve gear, a housing, a valve stem therein, a rock-shaft supported at one side of said housing, a disk secured on said rock-shaft having a ratchet shoulder on the periphery thereof, a lever mounted on said rock-shaft, a dog carried on said lever and adapted to engage said ratchet shoulder, a fixed eccentric on the engine shaft, eccentric actuated mechanism connected to said lever whereby said lever, disk and rock-shaft are caused to oscillate, means operated by said rock-shaft adapted to lift said valve-stem, and means supported on said housing adapted to disengage said dog from said ratchet shoulder, substantially as set forth.

3. In a valve gear, a housing, a valve-stem therein, a rock-shaft supported at one side of said housing, a disk secured on said rock-shaft, a ratchet shoulder on the periphery thereof, means secured on said rock-shaft adapted to lift said valve-stem, a lever mounted on the axis of said rock-shaft, a dog carried thereby adapted to engage said ratchet shoulder on said disk, eccentric actuated mechanism adapted to cause said lever to oscillate, an oscillatory cam mounted on the axis of said rock-shaft, a lever secured thereto, and governor controlled mechanism adapted to operate said lever and cause said cam to oscillate with relation to the speed of the engine, substantially as set forth.

4. In a valve gear, an engine shaft, a fixed eccentric thereon, centrifugal governor mechanism on said shaft, a valve-stem housing, a valve-stem therein, a rock-shaft mounted adjacent to said housing, a disk on said rock-shaft, a ratchet shoulder on said disk, means operated by said rock-shaft adapted to lift said valve-stem, an oscillatory lever mounted on the axis of said rock-shaft, a dog carried thereby adapted to engage said ratchet shoulder, means operated by said fixed eccentric to operate said oscillatory lever, a cam movably supported adjacent to said disk adapted to engage and disengage said dog from said ratchet shoulder, and mechanism connected to said cam and said governor mechanism to control the movement of said cam, substantially as set forth.

5. In a valve gear, an engine shaft, a fixed eccentric thereon, a centrifugal governor on said shaft, a valve-stem housing, a valve-stem therein, a rock-shaft mounted on said housing, a disk on said rock-shaft, a ratchet shoulder on said disk, means operated by said rock-shaft adapted to lift said valve-stem, an oscillatory lever mounted on the axis of said rock-shaft, a dog carried by said lever adapted to engage said ratchet shoulder, means operated by said fixed eccentric to actuate said oscillatory lever, an oscillatory cam mounted on the axis of said rock-shaft and adapted to engage said dog and disengage the same from said ratchet shoulder, and means operated by said centrifugal governor mechanism to control the oscillations of said cam with relation to the speed of the engine, substantially as set forth.

6. In a valve gear, an engine shaft, a fixed eccentric thereon, a centrifugal governor mechanism on said shaft, a valve-stem housing, a valve-stem therein, a rock-shaft mounted adjacent to said housing, means secured on said shaft adapted to lift said valve-stem, a disk on said rock-shaft, a ratchet shoulder on said disk, an oscillatory lever mounted on said rock-shaft, a dog carried by said lever and adapted to engage said ratchet shoulder, a projection on said dog extending laterally beyond the face of said disk, eccentric rod mechanism connected to said fixed eccentric and said oscillatory lever, an oscillatory cam mounted on said rock-shaft and adapted to engage said projection on said dog and disengage said dog from said ratchet shoulder, a lever on said cam, and means to operatively connect said lever with said governor mechanism, whereby, when said governor mechanism is operated said cam will be oscillated in opposition to said oscillatory lever and the length of said oscillations controlled by said governor with relation to the speed of the engine, substantially as set forth.

7. In an engine valve gear, mechanism operated by a fixed eccentric to open a steam admission valve, and mechanism controlled by a governor actuated shiftable eccentric adapted to disengage said valve opening mechanism, substantially as set forth.

In testimony whereof I affix my signature.

JOHN C. GLENN.

Copies of this patent may be obtained for five cents each, by addressing the "Commissioner of Patents, Washington, D. C."